(12) United States Patent
Kidwell (10) Patent No.: US 9,192,918 B2
(45) Date of Patent: Nov. 24, 2015

(54) EXCESS ENTHALPY UPON PRESSURIZATION OF DISPERSED PALLADIUM WITH HYDROGEN OR DEUTERIUM

(71) Applicant: David A. Kidwell, Alexandria, VA (US)

(72) Inventor: David A. Kidwell, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 74 days.

(21) Appl. No.: 13/962,024

(22) Filed: Aug. 8, 2013

(65) Prior Publication Data

US 2013/0316897 A1   Nov. 28, 2013

Related U.S. Application Data

(60) Continuation-in-part of application No. 13/921,195, filed on Jun. 18, 2013, which is a division of application No. 12/893,325, filed on Sep. 29, 2010, now abandoned.

(60) Provisional application No. 61/681,172, filed on Aug. 9, 2012, provisional application No. 61/813,752, filed on Apr. 19, 2013, provisional application No. 61/246,619, filed on Sep. 29, 2009.

(51) Int. Cl.
| | |
|---|---|
| B01J 23/58 | (2006.01) |
| B01J 23/44 | (2006.01) |
| B01J 21/04 | (2006.01) |
| B01J 23/42 | (2006.01) |
| B01J 23/63 | (2006.01) |
| B01J 29/04 | (2006.01) |
| B01J 35/10 | (2006.01) |
| B01J 37/02 | (2006.01) |

(52) U.S. Cl.
CPC ........... *B01J 23/58* (2013.01); *B01J 21/04* (2013.01); *B01J 23/42* (2013.01); *B01J 23/44* (2013.01); *B01J 23/63* (2013.01); *B01J 29/04* (2013.01); *B01J 35/1019* (2013.01); *B01J 37/0201* (2013.01); *B01J 37/0213* (2013.01)

(58) Field of Classification Search
None
See application file for complete search history.

(56) References Cited

U.S. PATENT DOCUMENTS

| | | |
|---|---|---|
| 6,746,597 B2 | 6/2004 | Zhou et al. |
| 7,396,795 B2 | 7/2008 | Reyes et al. |
| 7,429,358 B1 | 9/2008 | Gross |

OTHER PUBLICATIONS

X-Ray Diffraction and H-Storage in Ultra-Small Palladium Particles. D.G. Narehood et al. (International Journal of Hydrogen ENergy 34 (2009) 952-960.*

(Continued)

*Primary Examiner* — Melvin C Mayes
*Assistant Examiner* — Colette Nguyen
(74) *Attorney, Agent, or Firm* — US Naval Research Laboratory; Rebecca L. Forman (57) ABSTRACT

Disclosed herein is a method for producing excess enthalpy by (a) either dispersing atomic metal ions or clusters on a support and reacting the metal ions with a chelating ligand or dispersing chelated atomic metal ions on a support and (b) pressurizing with hydrogen or deuterium to reduce the metal ion to a metal atom resulting in the growth of dispersed metal particles less than 2 nm in diameter on the support. During the particle growth, there is a growth period during which a critical particle size is reached and excess enthalpy is produced. The growth period is typically several days long.

18 Claims, 3 Drawing Sheets

(56) References Cited

OTHER PUBLICATIONS

Aben, "Palladium Areas in Supported Catalysts Determination of Palladium Surface Areas in Supported Catalysts by Means of Hydrogen Chemisorption," Journal of Catalysis, 10, 224-229 (1968).

Arachi et al, "Alternation of the Pd Lattice in Nano-Sized-Pd/ZrO2 Composite during Hydrogen Absorption," X-ray Absorption Fine Structure (2007) 740-42, American Institute of Physics.

Arachi et al., "Structural analysis of nano-sized-Pd/ZrO2 composite after H(D) absorption," Solid State Ionics, 177, (2006), 1861-64.

Arata et al, "Formation of condensed metallic deuterium lattice and nuclear fusion," Proc. Jpn. Acad., Ser. B (2002) 78 (Ser. B), p. 57.

Chou et al., "Calorimetric Heat of Adsorption Measurements on Palladium," Journal of Catalysis, 104, 1-16 (1987).

Gallezot et al., "X-Ray Diffraction Study of Palladium Y Zeolite Location of Palladium Atoms before and after Hydrogen Reduction," Molecular Sieves, 66-73.

Heung et al, "Hydrogen Isotope Exchange Properties of Porous Solids Containing Hydrogen," WSRC-MS-2004-00089, Aug. 18, 2004.

Huang et al., "Chemical Activity of Palladium Clusters: Sorption of Hydrogen," J. Phys. Chem. B (2006) 110, 21783-87.

Narehood et al., "X-ray diffraction and H-storage in ultra-small palladium particles," International Journal of Hydrogen Energy, 34 (2009) 952-60.

Parchamazad et al., "A Novel Approach to Study Deuterium Desktop Fusion," The 14th International Conference on Condensed Matter Nuclear Science, Aug. 10, 2008.

Sermon, "Characterization of Palladium Blacks I. A Novel Hydrogen Pretreatment and Surface Area Determination of Palladium," Journal of Catalysis 24, 460-66 (1972).

Yamaura et al., "Hydrogen absorption of nanoscale Pd particles embedded in ZrO2 matrix prepared from Zr-Pd amorphous alloys," J. Mater. Res., vol. 17, No. 6, Jun. 2002, 1329-34.

Parchamazad, "LENR with Zeolites," www.youtube.com/watch?v=2L-IKozWjSA, Sep. 30, 2012 (visited Jun. 23, 2015).

* cited by examiner

EXCESS ENTHALPY UPON PRESSURIZATION OF DISPERSED PALLADIUM WITH HYDROGEN OR DEUTERIUM

PRIORITY CLAIM

This application claims priority from U.S. Provisional Application No. 61/681,172 filed on Aug. 9, 2012 by David A. Kidwell, entitled "EXCESS ENTHALPY UPON PRESSURIZATION OF DISPERSED PALLADIUM WITH HYDROGEN OR DEUTERIUM" and U.S. Provisional Application No. 61/813,752 filed on Apr. 19, 2013 by David A. Kidwell, entitled "EXCESS ENTHALPY UPON PRESSURIZATION OF DISPERSED PALLADIUM WITH HYDROGEN OR DEUTERIUM." The present application is a continuation-in-part application of U.S. application Ser. No. 13/921,195 filed by David A. Kidwell on Jun. 18, 2013 which is a division of U.S. application Ser. No. 12/893,325 filed by David A. Kidwell on Sep. 29, 2010 entitled "EXCESS ENTHALPY UPON PRESSURIZATION OF NANOSIZED METALS WITH DEUTERIUM," now abandoned, which was a non-provisional application that claimed the benefit of provisional application Ser. No. 61/246,619 by David A. Kidwell, filed Sep. 29, 2009 entitled "ANOMALOUS HEAT GENERATION FROM DEUTERIUM (OR PLATINUM) LOADED NANOPARTICLES." All applications listed in this paragraph as well as all other publications and patent documents referred to throughout this nonprovisional application are incorporated herein by reference.

BACKGROUND OF THE INVENTION

1. Field of the Invention

The present invention relates generally to the controlled growth of nanosized metal particles and more specifically to excess enthalpy resulting from the controlled growth of nanosized metal particles in the presence of hydrogen or deuterium.

2. Description of the Prior Art

The study of dispersed metals has a long history because of their use as catalysts. It is well-known in the art that as the size of the metal particles decrease, the activity increases to a point. For the purposes of this application, papers concerning the ratio of hydrogen to palladium atoms and the heats of adsorption of hydrogen into palladium are referenced, although the rate of organic chemical bond-forming and cracking reactions also vary with particle size. Many papers reference hydrogen reactions only, but for the purpose of this application, hydrogen and deuterium are considered identical in chemical nature for the ratios of uptake with a metal catalyst. For example, Chou, et al., and Huang, et al., have shown that the uptake of hydrogen increases rapidly when the particle size of the dispersed palladium in an oxide matrix decreases to less 1 nm or less. (Shu-Chin Chou, et al., "Isosteric Heat of Sorption of Dihydrogen on Alumina-supported Palladium," *J. Chem. Soc. Faraday Trans.*, 91, 949-51 (1995); Sheng-Yang Huang et al., "Chemical Activity of Palladium Clusters: Sorption of Hydrogen," *J. Phys. Chem. B*, 110, 21783-87 (2006)). Although, they did not state the particle size specifically, data from Huang can be used to estimate the particle size and approximate ratio of H:Pd as shown in Table 1. The heat of adsorption also increases with decreasing particle size. Chou, et al., studied a number of supports and preparation conditions and also showed that the heat of adsorption and loading ratio increased with decreasing particle size. (Pen Chou, et al., "Calorimetric Heat of Adsorption Measurements on Palladium I. Influence of Crystallite Size and Support on Hydrogen Adsorption," *J. of Catalysis*, 104, 1-16 (1987)). However, the estimated particle size in Chou's work was greater than 1.6 nm. Aben showed that hydrogen absorption could be used to estimate particle size and that the H:Pd ratio also increased with decreasing particle size, reaching a maximum H:Pd ratio of 0.83 in his study using ion exchanged silica. (P. C. Aben, "Palladium areas in supported catalysts: Determination of palladium surface areas in supported catalysts by means of hydrogen chemisorption," *Journal of Catalysis*, 10, 224-29 (1968)). The smallest size that Aben measured was 2.5 nm, and results showed that high pretreatment temperatures increased particle growth.

TABLE 1

Estimated particle sizes and H/Pd ratios as calculated from Huang. Note the sensitive dependence on the loading ratio with particle size. The more chemically accessible particles (>5 nm) show a loading similar to bulk palladium of 0.6.

| Preparation | Estimated Particle Size (nm) | Heat of Hydrogen Adsorption (kJ/mole) | Ratio H:Pd @ 0.2 bar |
|---|---|---|---|
| Pd Powder | 9 | 94 | 0.55 |
| 1.86% Pd/SiO2 (IW) | ~4 | 92 | 0.68 |
| 10% Pd/SiO2 (SG) | 1.1 | 131 | 0.9 |
| 5% Pd/SiO2 (SG) | 1 | 183 | 1.05 |

As the particle size must be small for high H:Pd ratios, one must disperse the particles on a support to keep them from sintering and growing too large. P. A. Sermon stated that even heating palladium black to 98° C. would cause sintering of the particles. (P. A. Sermon, "Characterization of palladium blacks: I. A novel hydrogen pretreatment and surface area determination of palladium," *J. of Catalysis*, 24, 460-66 (1972)).

As is well known in the art (for example, see Huang and references cited therein), there are three general methods to prepare dispersed metals on supports: (1) incipient wetness impregnation, where a solution of metal precursor is absorbed on the support. The amount of solution is just enough to wet the support. A variation on this method is wet impregnation where the amount of solution is greater than needed to just wet the support and the excess is removed at low temperature. (2) Ion exchange, where ions associated with the support are replaced with the metal ion of interest, generally using aqueous solutions of the metal of interest. Or (3) Sol-gel, where solutions of the metal are suspended in a growing polymer, which is generally inorganic in nature. After forming the supported metal precursor, the support is generally dried and calcined to remove water and organics. The heating may be done in air or an inert gas or in the presence of a reducing agent such as hydrogen. Finally, the metal ions are reduced to metal nanoparticles with a reducing agent such as hydrogen. This may be done at elevated temperatures. Elevated temperatures and high metal loading appear to increase particle size above 2 nm size and should be avoided during the preparation of the supported metal particles used in the present invention.

It is well-known in the art that repeated cycling of a supported catalyst can cause sintering and particle growth. This problem may be reduced by encapsulating the metal particles in a matrix such as a zeolite, a sol-gel, or a protective polymer. (D. G. Narehooda et al., "X-ray diffraction and H-storage in ultra-small palladium particles," *International Journal of Hydrogen Energy*, 34, 952-60 (2009)). Also, the use of zeolites as supports for metal particles is well-known in the art. For example, see: K. P. Prasanth et al., "Hydrogen uptake in palladium and ruthenium exchanged zeolite X," *Journal of Alloys and Compounds*, 466, 439-46 (2008); Kh. M. Minachev et al., "Deuterium Exchange with the Surface of Zeolite Catalysts 5. Palladium-Containing Zeolites," Academy of Sciences of the USSR, Moscow, translated from Izvestiya Akademii Nauk SSSR, Seriya Khimicheskaya, No. 12, pp. 2678-82 (December, 1978); and J. Michalik et al., "Studies of the Interaction of Pd3+ and Pd+ with Organic Adsorbates, Water, and Molecular Oxygen in Pd—Ca—X Zeolite by Electron Spin Resonance and Electron Spin-Echo Modulation Spectroscopy," *J. Phys. Chem.*, 89, 4553-60 (1985).

BRIEF SUMMARY OF THE INVENTION

The present invention provides a method for producing excess enthalpy by (a) either dispersing atomic metal ions or clusters on a support and reacting the metal ions with a chelating ligand or dispersing chelated atomic metal ions on a support and (b) pressurizing with hydrogen or deuterium to reduce the metal ion to a metal atom resulting in the growth of dispersed metal particles less than 2 nm in diameter on the support. During the particle growth, the particle grows through a critical particle size where excess enthalpy is produced during the growth process. By controlling the growth rate with metal chelates, the growth can be slowed sufficiently such that the excess enthalpy can last for several days.

One goal of this application is to slowly produce dispersed metal particles less than 2 nm in size on a support to that the particle growth goes through a critical size slowly enough to allow excess enthalpy to be produced for a long period of time rather than very rapidly. This is done by dispersing atomic metal ions or clusters on a support and providing sufficient chelating ligands so that during pressurization with hydrogen or deuterium, the reduction of the ions or clusters to zero valance metal is slowed. The preferred metal is palladium, and the preferred chelating ligand is a nitrite.

These and other features and advantages of the invention, as well as the invention itself, will become better understood by reference to the following detailed description, appended claims, and accompanying drawings.

DETAILED DESCRIPTION OF THE INVENTION

Figure 1:
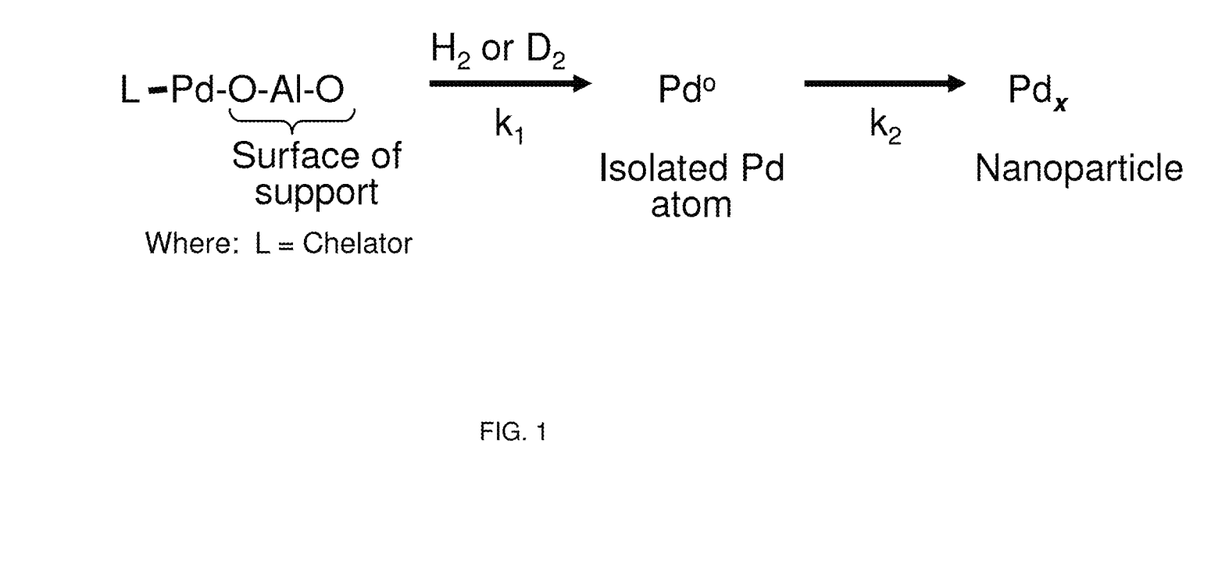
FIG. 1 shows the reaction scheme of the chelates slowing the reduction of the palladium ions to atoms. The atoms can then rapidly form nanoparticles but the rate is controlled by the supply of palladium atoms, which is controlled by the rate of reduction of the palladium ions bound to the support. In the reaction, $k_1 < k_2$.

As disclosed in the parent application (U.S. application Ser. No. 12/893,325, filed on Sep. 29, 2010, hereinafter referred to as "the Parent application"), gas pressurization of metal particles (palladium, platinum, etc.)<2 nm in size produces anomalous amounts of enthalpy in a reproducible manner. This enthalpy is produced in the presence of deuterium but not in the presence of hydrogen. Many control experiments ruled out the excess enthalpy being caused by impurities in the deuterium that may be absent in the hydrogen. Because the system is simple and reversible, all extra heat must be of chemical or some other unknown origin. In the Parent application the growth was confined by using a controlled pore material but it was rapid because the palladium ions were not constrained in their reduction from ion to atoms and the atoms were not constrained in agglomeration other than by the porous nature of the support. The present application continues that work by growing the nanosized metal particle in a controlled manner through the use of chelates in the presence of the hydrogen/deuterium though a critical size where excess enthalpy is observed. In the present application the chelates slow the reduction of the palladium ions to atoms. The atoms can then rapidly form nanoparticles but the rate is controlled by the supply of palladium atoms controlled by the rate of reduction. This is more easily illustrated by FIG. 1 where $k_1 < k_2$.

The Parent application disclosed using zeolites as an example of a porous structure with defined size cages to control the particle size and observe excess enthalpy. An example of how the measurements were accomplished is with a gas loading experiment. Gas loading experiments have the advantage that the system can be reversible—the enthalpy generated upon pressurization due to the work of pressurization of the gas and the uptake of hydrogen/deuterium into the palladium matrix and spillover of that hydrogen to the support is released upon evacuation. Therefore, the excess enthalpy can be readily calculated by integration of the evolved curve. An example of the reversibility of the work of pressurization and depressurization is shown by comparing the peaks sizes in FIGS. 2 and 3. The hydrogen produced more initial heat because it was pressurized to a higher pressure than the deuterium, yet this heat was recovered upon evacuation.

Any energy (endothermic or exothermic) that may be observed in this system must come from an irreversible chemical reaction. Typical reactions and processes to consider are the initial reduction of the PdO to Pd metal and water, water absorption by the matrix, oxidation of the hydrogen/deuterium by advantageous oxygen in the gas or absorbed on surfaces, water in the gas binding to the matrix, the Joule-Thompson effect, a change in the matrix lattice with pressure, or D-H exchange with water in the matrix or surface hydroxyls. Most chemical reactions produce gaseous materials that can be monitored by sampling the gas in the cell or they consume the pressurization gas and cause a pressure drop and thereby signal their presence. Thus, all the reactions listed above should make themselves known or that their effect (such as a change in lattice structure) should quickly be lost during repeated pressurization/depressurization cycles. Additionally, except for D-H exchange, pressurization with deuterium should produce similar amounts of heat as pressurization with hydrogen, i.e., any chemical isotope effect should be small.

Figure 2:
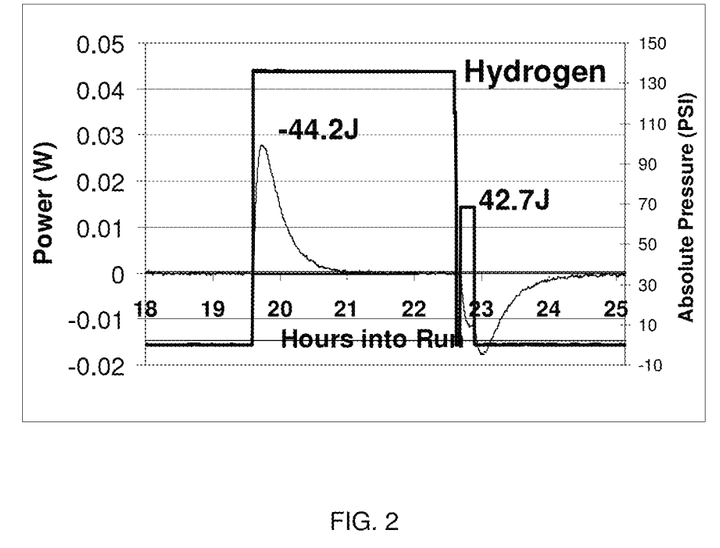
FIG. 2 shows a pressurization-depressurization cycle for hydrogen.
Figure 3:
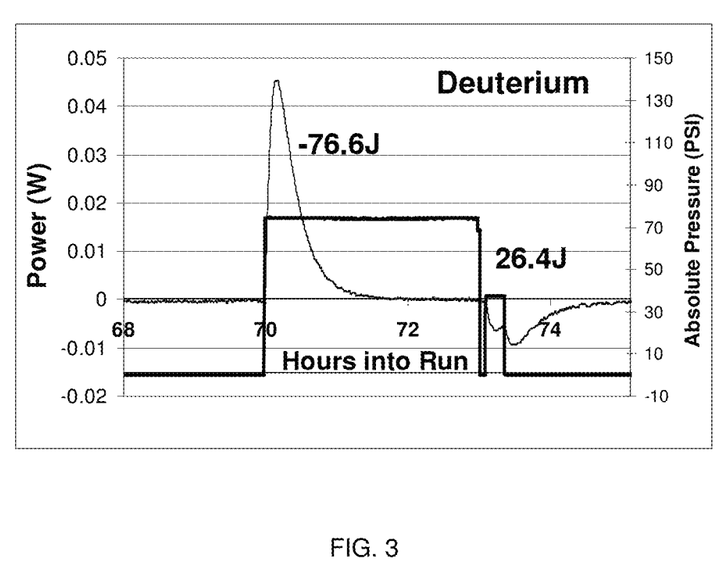
FIG. 3 shows a pressurization-depressurization cycle for deuterium.

In FIGS. 2 and 3, the pressure is shown with a heavy black line and the enthalpy is shown with the thin line. The depressurization is done in steps to allow better measurement of deuterium-hydrogen exchange (D-H exchange) by a Residual Gas Analyzer (RGA) connected to the sampling system. D-H exchange can account for some (but not all) of the excess enthalpy observed.

For the purpose of these experiments, the net or excess enthalpy during a pressurization cycle is defined as:

Excess Enthalpy=Enthalpy during pressurization+ Enthalpy during depressurization The sign of the heat is negative if the reaction is exothermic or positive for endothermic reactions.

What was surprising and unexpected is that, within experimental error, the hydrogen pressurization-depressurization cycle showed a net enthalpy of approximately zero with a ratio of heat-in/heat-out of 1.04 (44.2 J/42.7 J) in FIG. 2. In contrast, the deuterium pressurization-depressurization cycle was quite negative showing excess enthalpy with a ratio of heat-in/heat-out of 2.9 (76.6 J/26.4 J) in FIG. 3.

Figure 4:
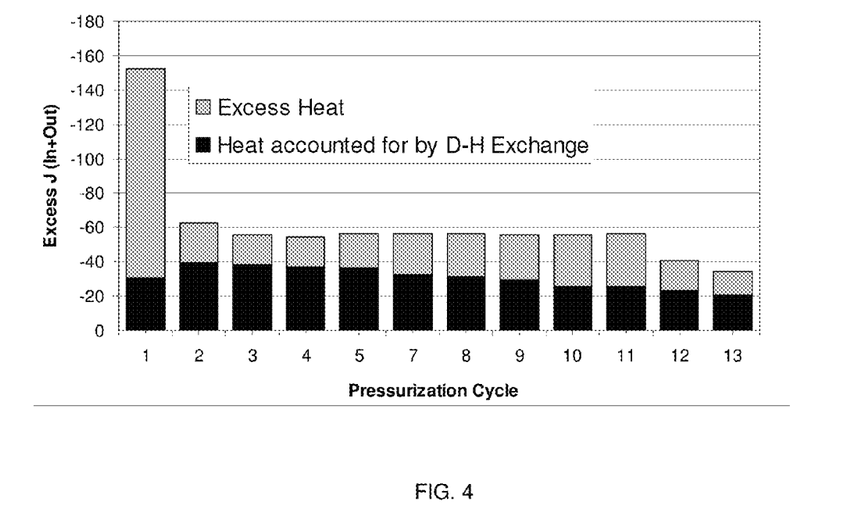
FIG. 4 shows excess enthalpy for each pressurization-depressurization cycle for 15.42 g of 1% Pd on alumina. The alumina was dried at 120° C. for 3 hours before use. Note that the calculated enthalpy from D-H exchange (dark bars) is not a constant fraction of the total heat. Excess enthalpy has the chemistry convention of having a negative sign if it is exothermic.

FIG. 4 shows that the excess enthalpy is relatively constant with pressurization-depressurization cycle number. The fall-off after pressurization-depressurization cycle 11 is likely due to growth of the particles. The amount of enthalpy accounted for by D-H exchange is shown with the dark bars. The origin of the other enthalpy is unknown. The first pressurization-depressurization cycle may contain other chemistry, such as reduction of the palladium ions to the palladium nanoparticle, and the enthalpy is larger or it is an example of growth though a critical size.

For observing excess enthalpy the particle size must be small, i.e., <2 nm. The matrix supporting the particles is less critical. Lower metal loadings favor smaller particle sizes. Generally, cycling causes particle growth unless the particle or the atoms of the reduced metal are constrained by the support. Additionally, because the heat is produced in pulses rather than steady-state, the application of that excess enthalpy is difficult.

The goal of the present application is to slowly produce dispersed metal particles <2 nm in size on/in a support such that the particle growth goes through a critical size slowly enough to allow excess enthalpy to be produced for a long period of time rather than in a pulsed mode as in the Parent application. This is achieved by dispersing atomic metal ions or clusters on a support and providing sufficient chelating ligands such that during the pressurization with either hydrogen or deuterium the reduction of the ions or clusters to zero valance metal is slowed. The preferred metal is palladium with the preferred chelating ligand being nitrite.

Various chelates may be used. Although nitrite was the preferred chelating ligand found in experimentation, any chelate that appropriately slows the reduction of the palladium ions to atoms may be used. Table 2 lists various chelates that were tried and the results of using each chelate. The first four chelates listed in Table 2 were for chelates used before impregnation with palladium. The last three chelates listed in Table 2 involved chelating after impregnation with palladium. Some of the chelates did not work under the standard conditions used in experimentation (temperature of <40'C and pressures <200 PSI), but should work at different conditions (e.g. higher temperatures or pressures) that were not tried.

TABLE 2

Various chelates employed

| Chelate tried | Result |
| --- | --- |
| $Pd(NH_3)_4Cl_2$ | Growth too fast - minutes rather than days |
| Pd-EDTA and $Pd(HFAA)_2$ | Growth too slow - not readily bound to support |
| $Pd(NO_3)_2$ | Growth too fast - binds too well to support - not dispersed |
| $X_2Pd(NO_2)_4$ – X = various mono and divalent cations | Growth just right |
| $Pd(NO_3)_2$ prepared with $Ca(NO_2)_2$ then $NH_4F$ | Sample turned white and after pressurization was inhomogeneous indicating palladium removed from the support and concentrated in local areas. |
| $Pd(NO_3)_2$ prepared with $Ca(NO_2)_2$ then sodium dicyamide | No reaction. Palladium did not reduce nor was deuterium consumed and color remained the same. |
| $Pd(NO_3)_2$ prepared with $Ca(NO_2)_2$ then $NaVO_3$ | |

It is a further goal of the present application to show that such particles display an enthalpy higher than can be accounted for with known reactions during pressurization. For the present application, the excess enthalpy is due to heat over and above that can be accounted for by known chemical reactions, not the excess heat measured by pressurization/depressurization cycles as in the Parent application. The excess enthalpy in the present application is at least 10 times greater than the excess enthalpy shown in the Parent application, and thus it can provide more useful work. Use of palladium nitrite as an impregnating material into a support is known in the art, but no mention is made of the enthalpy being measured during the reduction step nor the measurement of the possible products of the reduction. (M. Benkhaled et al., "Synthesis of highly dispersed palladium alumina supported particles: Influence of the particle surface density on physicochemical properties," *Applied Catalysis A: General*, 312, 1-11 (2006)).

Gas Loading of Nanopalladium

To obtain high loading of palladium through gas pressurization, the palladium nanoparticles should be <2 nm in diameter. Particles of this size are difficult to produce in bulk. Zeolites can be used to confine particle growth inside the Zeolite cages. (David A. Kidwell et al., "Does Gas Loading Produce Anomalous Heat?," 15th International Conference on Condensed Matter Nuclear Science, Rome, Italy (Oct. 5-9, 2009)). Although an abnormal amount of heat is evolved when pressurizing these materials with deuterium vs. hydrogen, much of the heat can be attributed to D-H exchange with the —OHs on the zeolite surface and adventitious water. Similar results were obtained on alumina if the loading was <2% palladium. (D. A. Kidwell et al., "Yes, Virginia there is Heat, but it is Likely of Chemical Origin," 9th International Workshop on Anomalies in Hydrogen/Deuterium Loaded Metals, Certosa di Pontignano in Siena, Italy, (17-19 Sep. 2010)). Cycling the alumina or zeolite systems showed the abnormal excess heat persisted for 8-10 cycles and then decreased linearly. It was postulated that the particles grew during cycling and growth above a critical size stopped heat production. However, palladium particles in the 2 nm and below regime are difficult to characterize by transmission electron microscopy so this hypothesis could not be fully tested.

Since the size of the particles to maximize excess energy production is unknown, the present invention provides a process to start with atomic palladium and during the pressurization process grow palladium through some critical size. With this scheme, heat was produced long-term (i.e., hours to days) in the presence of a constant pressure of deuterium. By varying the ligands around the palladium, ligands could be found where the growth was slowed to days rather than seconds.

Furthermore, the particles after reaction were much smaller as evidenced by the color of the support being tan rather than the characteristic gray of larger particles. With the slower particle growth, energy was produced for days in the presence of a constant pressure of deuterium. This long-term energy has been shown to be able to provide useful work (e.g., used to drive a Sterling engine).

The amount of energy in the current system is much greater than can be accounted for by D-H exchange that predominated earlier experiments with zeolites or alumina impregnated with $Pd(NH_3)_4Cl_2$. (D. A. Kidwell et al., "Yes, Virginia there is Heat, but it is Likely of Chemical Origin" Proceedings of the 15$^{th}$ International Conference on Condensed Matter Nuclear Science, Rome, Italy, pp. 100-109, available on-line at http://iccf15.frascati.enea.it/docs/proceedings.html (October 2009)). However, there may be other chemical explanations for this excess energy due to the ligands and materials present that are required for controlling the particle growth as some of these species can provide energy in a reducing environment. In a previous paper, simple methods were described to determine the reactants present on palladium impregnated alumina and some of the proposed products of the reactions. (D. A. Kidwell, "Colorimetric Assays for Reactants and Products of Palladium Nitrite Reduction on Alumina," available in U.S. Provisional Application 61/813,752 filed on Apr. 19, 2013 by David A. Kidwell). Equations were also developed to calculate the expected energy when these catalysts are reduced with hydrogen. With a model preparation of a control catalyst, all the energy could be explained by chemistry.

EXPERIMENTAL

The catalyst support was Sasol Alumina Spheres 1.8/210. Palladium nitrite was from Alfa Aesar. Palladium chloride was made by dissolving a 99.9 palladium coin in aqua regia and evaporating the acid. Other chemicals were reagent grade from commercial suppliers. The quantitations of the various species were as described previously. (D. A. Kidwell, "Colorimetric Assays for Reactants and Products of Palladium Nitrite Reduction on Alumina," available in U.S. Provisional Application 61/813,752 filed on Apr. 19, 2013 by David A. Kidwell). All enthalpy measurements were made with the Hart calorimeter. The measurement of energy produced and the gas loading experiments have been described previously. (D. A. Kidwell et al., "Yes, Virginia there is Heat, but it is Likely of Chemical Origin" Proceedings of the 15$^{th}$ International Conference on Condensed Matter Nuclear Science, Rome, Italy, pp. 100-109, available on-line at http://iccf15.frascati.enea.it/docs/proceedings.html (October 2009)). For this work, the Hart calorimeter was calibrated against electrical inputs and the calibration confirmed through the energy of combustion of hydrogen.

Confirmation of the Calorimetry Calibration Via Hydrogen Combustion

To cross-check the calorimeter calibrations with the electrical calibration, oxidation of hydrogen was employed. Volumes of the cell, lines, and manifold were calculated from pressure drops when various components were filled against a known test volume calibrated by weighting water or ethanol. The volumes were normalized to the testing temperature. The test cell was the same cell used for all the pressurization measurements with a 25 mL nominal volume. One pellet of 5% palladium on 3 mm alumina (Alfa Aesar Cat #41825) was added, and the cell placed in the calorimeter thermostated at 40° C. The cell was filled with air at atmospheric pressure and then over pressurized with one atmosphere of pure hydrogen and the hydrogen line sealed quickly. Rapid pressurization and long, thin gas lines prevented the air from back diffusing into the hydrogen. For safety, the cell was evacuated before disassembly or reuse. Under these conditions, oxygen from the air is the limiting reagent so that the amount of hydrogen added was not critical. The average energy evolved was 137.8 J (SD=0.55, n=4) compared to a calculated value of 138 J. For maximum reproducibility, the timing of the hydrogen introduction needed to be computer controlled. The combustion is rapid with a half-life as measured by the pressure drop of about 30 sec and the reaction is complete within 6 min. As this procedure produces gas mixtures above the 5% lower explosion limit for hydrogen, caution must be exercised to keep the volumes (and hence the expected energy output) small. The catalyst and set-up used showed no detonations (rapid pressure increases) after 13 measurements. Even if a detonation had occurred, the pressure rise can be calculated to be less than 18 bar vs. a 100 bar rating for the cell.

Typical Catalyst Preparation from Palladium Nitrate

An ion exchange process was employed for impregnation of the catalyst. Palladium nitrate x-hydrate (assumed to be 39% palladium by weight) (0.997 g, 0.389 g Pd) was dissolved in 11.9 g distilled water. Calcium nitrite (Aldrich, 30% solution, 3.1 g) was added and the solution warmed to 70 C for 30 min. The sources of nitrite and counter ions were varied as indicated in Table 5. The solution turns from deep brown to lemon yellow during the reaction. Sasol alumina beads (spheres 1.8/210−1.8 mm diameter with 210 m2/g surface area, 35.95 g) were wet with 49.47 g of distilled water and the palladium solution dropped slowly through a Whatman #41 filter on the bead slurry with shaking. The filtration was to remove insoluble, brown palladium oxide that forms in some older lots of palladium nitrate as the nitrate is unstable to heat and air. The palladium was allowed to react overnight. The excess water was removed by filtration, weighed, and the pellets washed three more times with approximately 100 mL each of water. Each wash was weighed and aliquots were taken to measure nitrite and palladium for calculation of the stoichiometry of binding. After washing, the catalyst was air dried overnight. The air-dried material had approximately 30.3 g of water present (84% over the staring material). Before use, the catalyst was dried in an oven at 120° C. for at least 12 hours, and the final weight was noted for determining palladium and nitrite recoveries. The weight was approximately 5% greater than the starting weight with about ⅔ of the gain due to water and the rest attributable to the chemical impregnation. The beads were bright yellow in color and became less yellow when wet and deeper yellow when hot. 1% is near the maximum palladium that will bind to the Sasol alumina via ion exchange under these conditions.

Typical Catalyst Preparation from Palladium Chloride

Palladium chloride (made by dissolving palladium coins in aqua regia) was assumed to be 60% Pd by weight. Appropriate amounts were slurried in water and completely dissolved by addition of the nitrite with warming. The catalyst was then prepared as for the palladium nitrate.

Preparation of $LiNO_2$

Lithium nitrite was not commercially available in the U.S. so it was synthesized from reaction of $Li_2CO_3+Ca(NO_2)_2$. The $LiNO_2$ solution was poured from the precipitated $CaCO_3$ so it is likely contained calcium ions are present as impurities.

Adsorption of Gases on the Catalyst

The used catalyst (and presumably the partially reduced catalyst) will selectively absorb gases. This selective adsorption, although small, could complicate the measurement of the gases used and those produced. Interestingly, the adsorption does not depend substantially on the pressure.

Calculation of Expected Enthalpy

When claiming anomalous energy for some reaction it is best to conservatively estimate the possible enthalpy from known chemistry. Table 3 lists possible chemical reactions and their conservatively estimated enthalpies calculated in a previous paper. (D. A. Kidwell, "Colorimetric Assays for Reactants and Products of Palladium Nitrite Reduction on Alumina," available in U.S. Provisional Application 61/813, 752 filed on Apr. 19, 2013 by David A. Kidwell). Equation 1 may be used for the expected enthalpy upon reduction of the catalyst. However, equation 1 requires measurement of both the starting nitrite and ending nitrite concentrations as well as measurement of the amount of nitrogen and ammonia formed. In a number of measurements, approximately 5% of the nitrite initially present remains after the reaction, and the nitrogen formed is about 5% of the initial nitrite (see Table 4). It is easier to overestimate the chemical energy using only equation 4 by assuming all the nitrite is consumed and converted to ammonia as this reaction is the most energetic per mole of nitrite. Using equation 4, the chemical energy possible is overestimated by about 10% (see Table 4), before even considering that equations 2-5 also are overestimates.

Enthalpy(J)=μMoles $N_2$*(−1124/1000)+(μMoles net nitrite−2*μMoles $N_2$)*(−663/1000)+(μMoles excess nitrite (relative to Pd) to ammonia)*(−463/1000)     Equation 1

Where:
−663 is from equation 4
−1124 is from equation 5
−463 is from equation 3 (for any excess nitrite)

TABLE 3

Possible chemical reactions and their calculated enthalpy. In the table, (✦) refers to the water or ammonia absorbed onto the support (the support indicated by HO—Al—). The enthalpies for entries 2-5 are conservative estimates of the maximum amount of energy possible. Entries 6-8 were calculated from standard heats of formation taking into account the absorption of ammonia or water onto the alumina support (assumed to be exothermic). The reaction with deuterium has not been corrected for the −8.2 kJ/mole extra energy of formation of $D_2O$ vs. $H_2O$. The extra energy can account for some of the energy differences when deuterium is used rather than hydrogen (Table 5).

| Equation Number | Postulated Reaction | Calculated Enthalpy kJ/mole | kJ/mole $H_2/D_2$ | kJ/mole Nitrite |
|---|---|---|---|---|
| 2 | $2NaNO_2 + 3H_2 \rightarrow 2NaOH + N_2 + 2H_2O(✦)$ | −683 per mole $N_2$ | −228 | −341 |
| 3 | $NaNO_2 + 3H_2 \rightarrow NaOH + NH_3(✦) + H_2O(✦)$ | −463 | −146 | −439 |
| 4 | $NO_2Pd\text{—}O\text{—}Al\text{—} + 4H_2 \rightarrow Pd^0 + NH_3(✦) + H_2O(✦) + HO\text{—}Al\text{—}$ | −663 | −166 | −663 |
| 5 | $2NO_2Pd\text{—}O\text{—}Al\text{—} + 5H_2 \rightarrow 2Pd^0 + N_2 + 4H_2O(✦) + 2HO\text{—}Al\text{—}$ | −1124 per mole $N_2$ | −225 | −562 |
| 6 | $2NO + 2H_2 \rightarrow N_2 + 2H_2O(✦)$ | −842 | −421 | — |
| 7 | $2NO_2 + 4H_2 \rightarrow N_2 + 4H_2O(✦)$ | −1390 per mole of $N_2$ | −348 | — |
| 8 | $N_2O + H_2 \rightarrow N_2 + H_2O(✦)$ | −413 | −413 | — |

TABLE 4

Comparison of the expected energy using equation 1 vs. equation 4 and mass balance of all the reactants. All the palladium was impregnated at a nominal 1% level. The nitrogen was measured in the headspace by the Residual Gas Analyzer during evacuation. The ammonia and initial and final nitrite concentrations were measured colorimetrically. The ammonia was lower than expected due to loss during evacuation of the cell for hydrogen removal. However, note that the percent recovery is not off by a factor of 2-3 necessary to account for the energy observed.

| Catalyst Number | Preparation conditions | μMoles $NO_2$— initial/g | μMoles $NO_2$— final/g | μMoles $N_2$/g | μMoles amines/g | Percent recovery N-species | Calculated energy J/g (Eq. 1) | Calculated energy J/g (Eq. 4) | Measured energy J/g | Ratio Observed/Expected |
|---|---|---|---|---|---|---|---|---|---|---|
| Hart4 05-02-12 Li-SA DAK043012 Deuterium | $Pd(NO_3)_2$ with $LiNO_2$ from $Ca(NO_2)_2$ | 123.6 | 2.4 | 11.5 | 79 | 84% | 73 | 80 | 199 | 2.5 |
| Hart5 05-02-12 Na-SA DAK043012 Deuterium | $Pd(NO_3)_2$ with $NaNO_2$ | 130.6 | 9.6 | 10.2 | 79 | 82% | 73 | 80 | 133 | 1.7 |
| Hart5 05-04-12 K-SA DAK043012 Deuterium | $Pd(NO_3)_2$ with $KNO_2$ | 116.6 | 14.9 | 7.1 | 64 | 77% | 64 | 67 | 130 | 1.9 |
| Hart4 05-04-12 Ca-SA DAK050212 Deuterium | $Pd(NO_3)_2$ with $Ca(NO_2)_2$ | 116.8 | 7.2 | 13.6 | 69 | 88% | 67 | 73 | 200 | 2.7 |

TABLE 5

Selected colorimetric quantitation of nitrite, expected energy, and measured energy for various representative catalysts preparations. All the palladium was impregnated at a nominal 1% level. The measured energy is the total energy from several pressurization reactions with the same catalyst and the calculated energy is calculated using the abbreviated method (equation 4). The catalysts were prepared from at least two different lots of reagents and supports. The nomenclature for the catalyst number is: (calorimeter design)(date run)(sample prep conditions)(date made)(initial gas). Rows 18-21 are with various additives some of which destroy the environment around the palladium ion. The additives were added to the prepared catalyst (DAK122012) using the wet impregnation method, the wet catalyst air dried overnight, and then dried at 120° C. before use.

| Entry Number | Catalyst Number | Preparation conditions | Starting [Nitrite] μmoles/g | Calculated energy J/g (Eq. 4) | Measured energy J/g | Ratio Observed/Expected | Comments |
|---|---|---|---|---|---|---|---|
| 1 | Hart5 08-02-12 Ca-SA DAK073112 Deuterium | $Pd(NO_3)_2$ with $Ca(NO_2)_2$ | 92 | 61 | 171 | 2.8 | |
| 2 | Hart5 08-05-12 Ca-SA DAK073112 Hydrogen | $Pd(NO_3)_2$ with $Ca(NO_2)_2$ | 92 | 61 | 159 | 2.6 | |
| 3 | Hart5 08-24-12 Ca-SA DAK073112 Deuterium.xls | $Pd(NO_3)_2$ with $Ca(NO_2)_2$ | 92 | 61 | 114 | 1.9 | Rxn at 10° C. Slow reaction, needed to warm to 30° C. for appreciable reaction rate |
| 4 | Hart5 09-09-12 Ca-SA DAK073112 Deuterium.xls | $Pd(NO_3)_2$ with $Ca(NO_2)_2$ | 92 | 61 | 154 | 2.5 | Repeat of reaction on Aug. 05, 2012, note reproducibility |
| 5 | Hart5 09-21-12 SA DAK073112 Deuterium low pressure | $Pd(NO_3)_2$ with $Ca(NO_2)_2$ | 92 | 61 | 152 | 2.5 | Repeat of reaction on Aug. 05, 2012 and Sep. 21, 2012 but at initial pressure of D2 of 32 PSIA |
| 6 | Hart5 09-14-12 K-SA DAK083012 Deuterium.xls | Purified $K_2Pd(NO_2)_4$ | 107 | 71 | 90 | 1.3 | Catalyst prepared as in . Kidwell, "Colorimetric Assays for Reactants and Products of Palladium Nitrite Reduction on Alumina" |
| 7 | Hart50 9-17-12 K-SA DAK090812 Deuterium.xls | Purified $K_2Pd(NO_2)_4$ | 111 | 73 | 48 | 0.7 | Catalyst prepared as in . Kidwell, "Colorimetric Assays for Reactants and Products of Palladium Nitrite Reduction on Alumina" |
| 8 | Hart5 11-01-12 Ca-SA DAK103012 Deuterium | $Pd(NO_3)_2$ with $Ca(NO_2)_2$ | 119 | 79 | 194 | 2.5 | |
| 9 | Hart5 11-06-12 Ca-SA DAK103012 Hydrogen | $Pd(NO_3)_2$ with $Ca(NO_2)_2$ | 119 | 79 | 158 | 2.0 | Repeat of reaction on Nov. 01, 2012 but with hydrogen rather than deuterium |
| 10 | Hart5 11-11-12 Ba-SA DAK110812 Deuterium | $Pd(NO_3)_2$ with $Ba(NO_2)_2$ | 89 | 59 | 153 | 2.6 | |
| 11 | Hart5 10-30-12 Ca-SA DAK070412 Deuterium | $Pd(NO_3)_2$ with $Ca(NO_2)_2$ | 123 | 81 | 147 | 1.8 | |
| 12 | Hart5 11-27-12 DAK070412 reused with KN02 Deuterium | See Comments | 120 | 80 | 95 | 1.2 | Reused DAK070412 wet impregnation with $KNO_2$ (not heated) |
| 13 | Hart5 10-26-12 Ca-SA DAK070412 reused with Nitrite Deuterium | See Comments | 104 | 69 | 90 | 1.3 | Reused DAK070412 after heating to 450° C. for 4 hr and then wet impregnation with nitrite |
| 14 | Hart5 11-15-12 Ca-SA DAK070412 reused with Nitrate Deuterium | See Comments | <0.25 | 46 | 52 | 1.1 | Reused DAK070412 after heating to 450° C. for 14 days. Then wet impregnation with nitrate. Expected energy calculated using nitrate values and impregnation levels. Examined if nitrate could be a product of nitrite air oxidation. |
| 15 | Hart5 12-24-12 Pd-SA DAK122012 Deuterium | $Pd(NO_3)_2$ with $Ca(NO_2)_2$ | 109 | 72 | 112 | 1.6 | |
| 16 | Hart5 01-03-13 Pd-SA DAK122012 Hydrogen | $Pd(NO_3)_2$ with $Ca(NO_2)_2$ | 109 | 72 | 107 | 1.5 | Repeat of reaction on Dec. 24, 2012 but with hydrogen rather than deuterium |

TABLE 5-continued

Selected colorimetric quantitation of nitrite, expected energy, and measured energy for various representative catalysts preparations. All the palladium was impregnated at a nominal 1% level. The measured energy is the total energy from several pressurization reactions with the same catalyst and the calculated energy is calculated using the abbreviated method (equation 4). The catalysts were prepared from at least two different lots of reagents and supports. The nomenclature for the catalyst number is: (calorimeter design)(date run)(sample prep conditions)(date made)(initial gas). Rows 18-21 are with various additives some of which destroy the environment around the palladium ion. The additives were added to the prepared catalyst (DAK122012) using the wet impregnation method, the wet catalyst air dried overnight, and then dried at 120° C. before use.

| Entry Number | Catalyst Number | Preparation conditions | Starting [Nitrite] µmoles/g | Calculated energy J/g (Eq. 4) | Measured energy J/g | Ratio Observed/Expected | Comments |
|---|---|---|---|---|---|---|---|
| 17 | Hart5 01-07-13 Pd-SA DAK122012 Hydrogen | $Pd(NO_3)_2$ with $Ca(NO_2)_2$ | 109 | 72 | 107 | 1.5 | Repeat of reaction on Jan. 03, 2012 with hydrogen showing reproducibility |
| 18 | Hart5 01-10-13 Pd-SA DAK122012 plus KCl Deuterium | $Pd(NO_3)_2$ with $Ca(NO_2)_2$ then KCl | 91 | 60 | 117 | 1.9 | |
| 19 | Hart5 01-15-13 Pd-SA DAK122012 plus $NH_4F$ Deuterium | $Pd(NO_3)_2$ with $Ca(NO_2)_2$ then $NH_4F$ | 37 | 24 | 31 | 1.3 | Sample turned white and after pressurization was inhomogeneous indicating palladium removed from the support and concentrated in local areas |
| 20 | Hart5 01-18-13 Pd-SA DAK122012 plus Dicyamide Deuterium | $Pd(NO_3)_2$ with $Ca(NO_2)_2$ then sodium dicyamide | 106 | 70 | NR | NR | No reaction. Palladium did not reduce nor was deuterium consumed and color remained the same |
| 21 | Hart5 01-22-13 Pd-SA DAK122012 plus $NaVO_3$ Deuterium | $Pd(NO_3)_2$ with $Ca(NO_2)_2$ then $NaVO_3$ | 123 | 82 | 101 | 1.2 | |
| 22 | Hart5 01-25-13 Pd-SA DAK122012 plus $KNO_2$ Deuterium | $Pd(NO_3)_2$ with $Ca(NO_2)_2$ then extra $KNO_2$ | 254 | 169 | 281 | 1.7 | The extra enthalpy from the extra nitrite cannot be accounted by the extra nitrite |
| 23 | Hart5 12-03-12 Pd-SA-Ca DAK112712 Deuterium. | $PdCl_2$ with $Ca(NO_2)_2$ | 93 | 62 | 76 | 1.2 | |
| 24 | Hart5 02-08-13 Pd-SA DAK112712 plus KNO2 Deuterium.xls | $PdCl_2$ with $Ca(NO_2)_2$ See Comments | 215 | 142 | 177 | 1.2 | Wet impregnation with extra KNO2 at initial pressure of 74 PSIA |
| 25 | Hart5 02-14-13 Pd-SA DAK112712 plus KNO2 Deuterium Low pressure | See Comments | 215 | 142 | 173 | 1.2 | Repeat of reaction on Feb. 08, 2013 but at initial pressure of 32 PSIA |
| 26 | Hart5 03-13-13 Pd-SA DAK112712 plus KNO2 Deuterium-HP.xls | See Comments | 215 | 142 | 155 | 1.1 | Repeat of reaction on Feb. 08, 2013 but at initial pressure of 500 PSIA and |
| 27 | Hart5 02-12-13 Pd-SA DAK112712 plus KNO2 Hydrogen | See Comments | 215 | 142 | 165 | 1.2 | Repeat of reaction on Feb. 08, 2013 with hydrogen at initial pressure of 68 PSIA |
| 28 | Hart5 03-05-13 Pd-SA DAK112712 plus KNO2 Hydrogen-LP.xls | See Comments | 215 | 142 | 164 | 1.2 | Repeat of reaction on Feb. 12, 2013 with initial pressure of 17 PSIA |
| 29 | Hart5 03-07-13 Pd-SA DAK112712 plus KNO2 Hydrogen-HP.xls | See Comments | 215 | 142 | 168 | 1.2 | Repeat of reaction on Feb. 12, 2013 with initial pressure of 500 PSIA |
| 30 | Hart5 03-14-13 Pd-SA DAK112712 plus KNO2 Hydrogen-VLP.xls | See Comments | 215 | 142 | 183 | 1.3 | Repeat of reaction on Feb. 12, 2013 with initial pressure of 22 PSIA but constant pressure (cell open to tank) |

Table 5 lists calculated (using equation 4) and measured enthalpy values for a number of catalyst preparations. In many cases, the observed energy is larger than the calculated energy, sometimes by a factor of 2.8. The calibration of the calorimetry was done electrically and its accuracy checked using hydrogen combustion. The values were within 1% of the expected value. Likewise, the reproducibility of a measurement on a batch of catalyst is within 3% (compare entries 2 with 4 and entries 8 with 9). Neither the accuracy nor the precision of the measurement can account for the up to 280% discrepancy in the measured energy vs. what is expected.

Some of the parameters explored were the presence of excess nitrite, the initial pressure, the reaction temperature, hydrogen vs. deuterium, and the presence of additives. Generally, higher pressure and the presence of excess nitrites caused a higher peak temperature to be generated and the catalyst became blacker indicating larger particles had formed. Lower pressures produced slightly more energy for a given catalyst system (compare entries 24-30). If the excess energy is predicated on <2 nm palladium particles, then the used catalyst should not be black. It was hypothesized that the observed vs. expected ratio could be influenced by other impurities, especially chloride. Chloride was thought to be detrimental during catalyst preparation. However, upon addition of chloride after the catalyst was prepared (compare entries 18 to 15), the energy/g was slightly enhanced. What impurity is responsible for the larger variations in excess energy between batches is unknown. The use of deuterium gave slightly more heat than hydrogen (Table 5) but this difference may be due to D-H exchange. For a given catalyst batch, the addition of excess nitrite or varying the pressure did not affect the excess energy to a large extent (compare entries 24-30). The amount of energy/mole of $H_2/D_2$ consumed (see below) was affected by the initial pressurization. Much of energy/mole effect is overshadowed by the chemistry as the amount of energy/g of material was large, i.e. subsequent pressurization upon which the total energy/g, reported in Table 5, show normal chemistry of about 200 J/mole of $H_2/D_2$ consumed.

Catalyst material could be reused by oxidizing the palladium by heating in air but this treatment only partially restored the excess energy (compare entries 11-14). Impregnation of nitrite onto used catalyst that has large palladium particles present (at least before heating) on the alumina should produce the same unseen byproducts (if they are really unseen) that causes excess energy in virgin catalysts. To the extent that these reused materials produce the amount of energy expected from chemistry reinforces the concept that the quantitation of the starting materials and products are likely correct.

Figure 5:
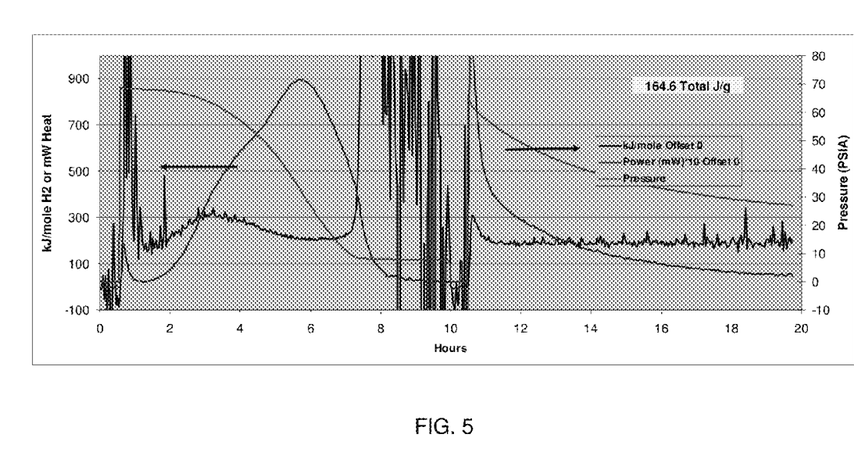
FIG. 5 shows typical evolution of power vs. time from two pressurizations.

The evolution of the power vs. time can also be monitored during the pressurization cycles. A typical plot is shown in FIG. 5 for a sealed vessel initially pressurized to approximately 70 PSIA of hydrogen. After the first hydrogen introduction, the energy production starts slowly in concert with the consumption of hydrogen. Likely, the palladium is being reduced producing energy. This localized heat also increases the reaction rate, as the alumina beads are poor heat conductors to transmit the heat to the surroundings. The increased heat increases any chemical reactions. Diluting the active beads with uncoated alumina delays and reduces the peak of this energy production. Additionally, palladium nanoparticles are formed, which can catalyze the splitting of hydrogen into more reactive species that diffuse on the alumina substrate (spillover effect) and reduce other nearby palladium ions and nitrite ligands. In summary, the initial reactions catalyze the subsequent reactions until the hydrogen gas is depleted. There also appears to be two kinds of reactions occurring in the first cycle as evidenced by the discontinuity in the energy evolution at about 4 hours.

Before the second pressurization pulse, the vessel was evacuated and the gases analyzed for volatile species. Only water, ammonia, hydrogen, and nitrogen were present. After a variable evacuation time, the vessel was repressurized and sealed. The energy production was immediate, likely because the palladium nanoparticles were already present and can produce spillover hydrogen to reduce any remaining nitrite on the catalyst. After the second pressurization pulse, the vessel was again evacuated and the gases analyzed. Generally, far less nitrogen was formed in the second and subsequent pressurizations. Depending upon the fill pressure, which sets the amount of hydrogen available, it can take up to six cycles to reduce the evolved energy (chemical and extra) to <100 J.

Energy/Mole of Hydrogen Consumed

Hydrogen provides the chemical energy in the form of a reducing agent (it gets oxidized by some species in the system). Besides the overall energy obtained, the energy per mole of reactant can be measured. The rate of consumption of the hydrogen can be monitored by the pressure drop and compared to the rate of energy evolution. This is shown in FIG. 5, which shows the typical evolution of power vs. time from the pressurization of Hart 5 02-12-13 (DAK112712) plus $KNO_2$ with hydrogen (Table 3, entry 27). The power is multiplied by 10 to increase the resolution. The calculation of kJ/mole of hydrogen consumed is averaged over ca. 2.5 min intervals. It is noisy when the pressure changes are small (during the initial pressurization and towards when the $H_2$ is depleted). An offset of the power to the pressure is sometimes employed if the averaging for the calculations is small. The pressure responds quickly whereas heat, depending upon its generation point, could take a few minutes to transfer from the cell to the calorimeter. In this case, no offset was applied. The graph has the correction for the effect of the nitrogen produced on the pressure. A total of 165 J/g was generated with this catalyst from the two pressurization pulses Only equations 6-8 (reduction of NOx) have sufficient enthalpy to provide the observed energy/mole of $H_2$ consumed. Frequently, the second and subsequent pressurizations average about 200 kJ/mole of hydrogen consumed. This amount of energy could be modeled with a mixture of equations 4 and 5 from Table 3 to within 10%, taking into account the amount of nitrogen and ammonia formed vs. hydrogen consumed. If the energy evolution is small and the pressure drop is also small, the resultant calculation can be quite noisy, which is observed during the beginning and ending in a pressurization cycle. This energy/mole of $H_2$ observed can be compared to that calculated in Table 3. The very large energy/mole $H_2$ (total energy is small (17 J) and the pressure changes very little) during the initial hour of the reaction is consistent with the energy of pressurization, which is non-chemical and therefore does not consume $H_2$.

The measurement of the energy/mole of $H_2$ consumed is likely an underestimate of the reaction potential because it does not account for the absorption of hydrogen by the support due to spillover. Energy from spillover should be a small fraction of that given in equations 2-5 and it can be estimated from the endothermic reaction upon evacuation of the cell. To the extent that this lower energetic reaction occurs, the energy/mole of $H_2$ consumed would also be lowered. The measurement of pressure drop is not an absolute measure of consumption of hydrogen because the consumption of hydrogen is opposed by the production of nitrogen. The total amount of nitrogen can be accounted for by the analysis of the residual gases when the reaction is complete. The pressure of hydrogen at any point than may be corrected with the assumption that the nitrogen was produced in proportion to the energy generated. This correction reduced the peak energy/mole of $H_2$ consumed at 3 hours by 2.3%.

Can Other Possible Chemical Reactions Account for the Observed Energy?

Both the energy produced per mole of nitrogen and ammonia formed and the hydrogen consumed must be consistent with the postulated chemistry. Reactions 6-8 in Table 4 are possible alternative reactions (collectively referred to as NOx reactions) that produce more energy per mole of hydrogen consumed than do reactions 2-5 but they do not consume nitrite. One could hypothesize that the NOx reactants are formed from the nitrite during impregnation (as in some cases only ca. 50% of the impregnated nitrite is accounted for, and NOx is not detectable by the colorimetric assays employed). These NOx reactants are gases and must be tightly absorbed to the support. Although IR active, the NOx reactants are not observed by FTIR spectroscopy on the unreacted support and therefore their concentration must be low. Likewise, the support is evacuated for long periods of time down to the $10^{-5}$ Torr range and below before the initial hydrogen pressurization step and the off-gases examined by a residual gas analyzer. NOx molecules are absent. If NOx were present it must be tightly absorbed and at low concentrations. Nevertheless, it would be prudent to consider what would be the consequence of NOx presence in some undetectable yet still chemically reactive form. One calculation assumed that no NOx was present and demonstrated that the energy produced was 35% more than the hydrogen consumed could account. Assuming that the nitrogen is generated only from the unseen NOx present and calculating if this unseen NOx could account for the excess energy, NOx does reduce the percentage of accounted for energy slightly but the excess is still present. Additionally, the use of NOx as an unseen oxidant cannot be reconciled with the need to remove nitrite during the reaction—i.e. it takes a certain number of moles of hydrogen to reduce the nitrite, which can be observed disappearing. This reduction generates a certain amount of energy depending upon the products assumed. The conclusion for this type of analysis is that if NOx were present in an unseen form, it could not simultaneously account for consumption of hydrogen, the observed energy, the disappearance of nitrite, the production of expected products, the mass balance of products and reactants (Table 4), and the calculated energy/mole of $H_2$ consumed. A similar analysis can be done assuming that the residual gas does not reflect the true production of nitrogen due to the nitrogen being absorbed onto the support Like the analysis with NOx, this consideration cannot account for all the observations. Therefore, the excess energy must come from another, unknown source.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method for producing excess enthalpy, comprising:
    dispersing atomic metal ions or clusters in or on a support;
    reacting said supported metal ions or clusters with a chelating ligand; and
    pressurizing with hydrogen or deuterium to reduce the metal ion to a metal atom resulting in the growth of dispersed metal particles less than 2 nm in diameter in or on the support;
    wherein during the particle growth there is a growth period during which a critical particle size is reached, wherein during the growth period excess enthalpy is produced, and wherein the growth period is at least one hour.

2. The method of claim 1, wherein the metal comprises palladium.

3. The method of claim 1, wherein the chelating ligand comprises nitrite.

4. The method of claim 1, wherein the excess enthalpy can provide useful work.

5. The method of claim 1, additionally comprising providing alkaline earth ions.

6. The method of claim 5 wherein the alkaline earth ions comprise calcium, barium, or a combination thereof.

7. A method for producing excess enthalpy, comprising:
    preparing a chelating atomic metal ion or cluster;
    dispersing said chelated atomic metal ion or cluster in or on a support; and
    pressurizing with hydrogen or deuterium to reduce the metal ion to a metal atom resulting in the growth of dispersed metal particles less than 2 nm in diameter in or on the support;
    wherein during the particle growth there is a growth period during which a critical particle size is reached, wherein during the growth period excess enthalpy is produced, and wherein the growth period is at least one hour.

8. The method of claim 7, wherein the metal comprises palladium.

9. The method of claim 7, wherein the chelating ligand comprises nitrite.

10. The method of claim 7, wherein the excess enthalpy can provide useful work.

11. The method of claim 7, additionally comprising providing alkaline earth ions.

12. The method of claim 11, wherein the alkaline earth ions comprise calcium, barium, or a combination thereof.

13. A method for producing excess enthalpy, comprising:
    selecting a chelate that will reduce the rate of reduction of a metal ion to a metal atom;
    either dispersing atomic metal ions or clusters in or on a support and reacting said supported metal ions or clusters with said chelate or dispersing chelated atomic metal ions or clusters in or on a support; and
    pressurizing with hydrogen or deuterium to reduce the metal ion to a metal atom resulting in the growth of dispersed metal particles less than 2 nm in diameter in or on the support;
    wherein during the particle growth there is a growth period during which a critical particle size is reached, wherein during the growth period excess enthalpy is produced, and wherein the growth period is at least one hour.

14. The method of claim 13, wherein the metal comprises palladium.

15. The method of claim 13, wherein the chelate comprises nitrite.

16. The method of claim 13, wherein the excess enthalpy can provide useful work.

17. The method of claim 13, additionally comprising providing alkaline earth ions.

18. The method of claim 17, wherein the alkaline earth ions comprise calcium, barium, or a combination thereof.

* * * * *